# (12) United States Patent
Mushkin

(10) Patent No.: US 6,859,443 B1
(45) Date of Patent: Feb. 22, 2005

(54) BANDWIDTH ALLOCATION FOR COMMUNICATION SYSTEMS

(75) Inventor: Mordechai Mushkin, Nirit (IL)

(73) Assignee: Teledata Networks Ltd., Herzliya (IL)

( * ) Notice: Subject to any disclaimer, the term of this patent is extended or adjusted under 35 U.S.C. 154(b) by 0 days.

(21) Appl. No.: 09/503,435

(22) Filed: Feb. 14, 2000

(51) Int. Cl.$^7$ ................................................ H04B 7/212
(52) U.S. Cl. ........................................ 370/324; 370/344
(58) Field of Search ................................. 370/319, 320, 370/481, 324, 442, 441, 343, 344, 329, 330; 375/130, 142, 150

(56) References Cited

U.S. PATENT DOCUMENTS

| | | | | |
|---|---|---|---|---|
| 5,257,283 A | * | 10/1993 | Gilhousen et al. | 455/522 |
| 5,329,546 A | * | 7/1994 | Lee | 370/342 |
| 5,452,290 A | * | 9/1995 | Mihm, Jr. | 370/436 |
| 5,548,616 A | * | 8/1996 | Mucke et al. | 370/342 |
| 5,564,074 A | * | 10/1996 | Juntti | 455/522 |
| 5,765,098 A | | 6/1998 | Bella | |
| 6,208,871 B1 | * | 3/2001 | Hall et al. | 455/517 |

FOREIGN PATENT DOCUMENTS

EP   0 771 085   5/1997

OTHER PUBLICATIONS

Chiba et al., "Theory and Performance of Frequency Assignment Schemes for Carriers eith Different Bandwidths Under Demand Assignment SCPC/FDMA Operation," *IEICE Trans. Commun.*, E75–B(6), 476–486 (Jun. 1992).

Siddiqui et al., "Airline—The Flexible Radio Access System," *Ericsson Review*, 73(3), 124–132; Stockholm, SE (1993).

* cited by examiner

*Primary Examiner*—Chi Pham
*Assistant Examiner*—Keith M. George
(74) *Attorney, Agent, or Firm*—Blakely Sokoloff Taylor & Zafman LLP

(57) ABSTRACT

A method of dynamic modification of a communication link is provided. The method includes assigning a new carrier frequency to a first communication link. The method further includes adjusting the carrier frequency of the first communication link until the new carrier frequency is reached without substantially interrupting the first communication link. Further, the first communication link uses a single link during the modification.

17 Claims, 8 Drawing Sheets

BANDWIDTH ALLOCATION FOR COMMUNICATION SYSTEMS

TECHNICAL FIELD

The present invention is related to the field of communication and, in particular, to bandwidth allocation for communication systems.

BACKGROUND

Point to Multi-Point (PMP) Digital Radio Relay Systems (DRRS) are well known. A typical PMP DRRS system 10 is shown in FIG. 1. System 10 generally comprises a base station (BS) 12 and a plurality of remote stations (RS) 14-1, ..., 14-N. Each of base station 12 and remote stations 14-1, ..., 14-N is equipped with a transceiver and antenna for communication. The system of FIG. 1 is very general and the base station 12 may be either a ground-based central office or satellite transceiver. The remote stations 14-1, ..., 14-N may be cellular telephones, remote fixed locations or mobile or fixed switchboards or central offices. Depending on the type of system, each of base station 12 and remote stations 14-1, ..., 14-N may also transmit the information between a user and another station.

The radio communication links shown in FIG. 1 are two way, and communication between the base station 12 and the remote stations 14-1, ..., 14-N is generally two way or duplex. Generally, this duplex communication comprises a down-link or forward link 16-1, ..., 16-N (BS to RS) and an up-link or return link 18-1, ..., 18-N (RS to BS). Generally one of two duplex methods is used, Frequency Division Duplexing (FDD) or Time Division Duplexing (TDD).

In FDD, duplexing separation is achieved by using different frequencies for the up-link and down-link. In many cases, FDD systems are required by regulatory bodies to operate within a frequency channel plan using a fixed frequency difference between the up-link and the down-link. In order to achieve wide range transmission, the transmission power of radio relay systems may be as high as +10 to +30 dBm and the sensitivity can be as low as −90 to −110 dBm. Therefore, well over 100 dB isolation is typically provided between transmitter and receiver. This is typically achieved by frequency separation and filtering. Further, in systems in which the same antenna is used for transmission and reception, a circulator is also used. Since the frequency separation between transmitter and receiver may be as low as a few percent, the filters are usually large and expensive devices.

In TDD systems, duplex separation is achieved by transmitting the up-link and down-link in different time slots. TDD does not require isolation between the transmitter and receiver (although a TR device or the like may be required to provide overloading of the receiver when the transmitter is operating). Furthermore, the receiver and transmitter may share certain hardware such as filters and RF sources.

Another aspect of PMP DRRS is the multiple access method used to allocate time/bandwidth so that a plurality of remote stations 14-1, ..., 14-N can communicate with the same base station 12 without interfering with each other. Several methods are in general use. These include Frequency Division Multiple Access (FDMA), Time Division Multiple Access (TDMA) and Code Division Multiple Access (CDMA). The access method is intended to avoid interference between the up-links. No such problem exists for the down-links; however, the common practice is to employ the same arrangement of "access" on the down-links as on the up-links.

In FDMA, the base station 12 communicates with each remote station 14-1, ..., 14-N using at least one unique radio frequency. In general, the total bandwidth is separated into channels each having a given bandwidth. One or two channels are assigned to each of the remote stations 14-1, ..., 14-N for use in duplex transmission between the remote stations 14-1, ..., 14-N and the base station 12. In FDD, a separate frequency channel is assigned to a given up-link 18-1, ..., 18-N and its associated down-link 16-1, ..., 16-N. In TDD the same frequency bandwidth is assigned to the associated down-link 16-1, ..., 16-N and up-link 18-1, ..., 18-N for each remote station 14-1, ..., 14-N. For the same total transmission capacity, the total bandwidth assigned to a channel is the same whether FDD or TDD is used.

In TDMA, time is divided into repeating time frames. Each time frame is separated into time slots one of which is assigned to each link. In FDD, the time slots at a given frequency are used for up-links 118-1, ..., 118-N or down-links 116-1, ..., 116-N, with similar time slots at a different frequency being used for the other links. In TDD, half of the time slots are used for up-links 118-1, ..., 118-N and half are used for down-links 116-1, ..., 116-N.

FDMA has certain advantages over TDMA. In particular, FDMA signals are transmitted continuously (for FDD) or half the time (for TDD). In TDMA, transmission takes place only during the allotted slot. Thus, for the same average transmission, a higher peak transmission rate is required for TDMA. For this reason, the sensitivity of TDMA systems are lower and higher peak transmission power is required for the same system gain. Due to the lower transmission rate, FDMA systems are typically less susceptible to signal distortion caused by selective fading than TDMA systems.

TDMA has certain advantages over FDMA. In particular, due to the naturally interrupted nature of the links, it is easier to allocate the time slots and to change the allocation. Even when FDD is implemented, it is sometimes possible to arrange the time slots (see FIG. 2) such that a given remote station 14-1, ..., 14-N does not send and receive at the same time. In those cases, the system 10 has the benefits of a TDD system in that there is no need for a duplexer, nor for isolation between the transmitter and receiver of the remote stations 14-1, ..., 14-N. Furthermore, there is the possibility of hardware sharing in the remote stations 14-1, ..., 14-N as described above.

One of the requirements for every communication system is the synchronization of the transmitter and receiver. One or more of carrier frequency synchronization, carrier phase synchronization (for improved detection sensitivity) and symbol (rate and phase) synchronization are required for proper transmission and receiving of communications.

Generally, synchronization is performed in two steps. These steps are acquisition, performed at link set-up and when frequencies are changed and tracking, based on an analysis of the signals received during regular transmission. While acquisition way take a long time, due to uncertainty of the characteristics of the signal being acquired, time may be reduced by use of special training sequences. In general, acquisition is performed in three consecutive steps, namely, carrier frequency acquisition, timing clock acquisition (frequency and phase) and carrier phase acquisition (if required). In FDMA systems that operate in FDD, transmission is continuous so that acquisition is required only at link set-up. In FDMA systems that operate in TDD and in TDMA systems the transmission is not continuous such that the signal must be reacquired for each transmission (frame). The acquisition is usually performed on a training sequence or preamble, which, since it does not carry information, results in a reduced transmission capacity. This is another advantage of FDMA/FDD systems.

Multi-user communication systems generally operate with a fixed overall bandwidth allocation. In some systems, a Fixed Assignment (FA) of bandwidth is used. This may be a uniform assignment, in which each remote stations 14-1, . . . , 14-N receives the same communication bandwidth (or length of time slot) or non-uniform assignment (in which each RS receives a different bandwidth). Other systems utilize a Demand Assignment (DA) in which bandwidth is dynamically assigned for each remote station 14-1, . . . , 14-N in accordance with its current requirements for service.

Data rates of the individual links may be uniform or non-uniform, depending on the service provided to and by the remote stations 14-1, . . . , 14-N. For example, if each remote station 14-1, . . . , 14-N provides service to a single line, and all lines are of the same kind, the data rates would generally be the same for all the links. On the other hand, multi-line remote stations, with different types or numbers of active lines or different kinds of services would require different data rates (which implies different bandwidths), for the different remote stations 14-1, . . . , 14-N.

In DA, data rates or bandwidths can be assigned statically (fixed so long as the link is operating) or dynamically (changed during operation of the link without any break in service). For example, the data rate or bandwidth would be changed dynamically if an additional subscriber served by a remote station 14-1, . . . , 14-N became active or if a subscriber hung up.

Modulation rates of the individual links may be uniform or non-uniform, with non-uniform rates being used to adjust each link to operating conditions, such as distance and propagation conditions. For example, the modulation rate may be changed to add error-correcting schemes when the propagation conditions are poor. Modulation rates can be static or dynamic. Non-uniform and dynamic modulation rates are addressed, for example, in "Modem Quadrature Amplitude Modulation," IEEE Press, NY, 1994, Chapter 13.

The data rate and the modulation rate of an individual link determine its symbol rate and the symbol rate determines the bandwidth occupied. Thus, the bandwidth assignment (frequency slots in FDMA or time slots in TDMA) can be uniform or non-uniform, static or dynamic.

In TDMA, with FA and DA, uniform and non-uniform static and dynamic assignment of time slots are easily implemented in an efficient manner by varying the time slot assignment between frames. Due to the interrupted nature of each link, it is easy to change its parameters (time slot location, time slot length, and modulation rate) between frames.

In FDMA with FA, non-uniform static assignment of frequency slots can be easily implemented, by simply dividing the bandwidth available into non-uniform portions and assigning the portions as required. However, dynamic reassignment of bandwidth (DA) can be implemented easily only in a non-efficient manner and only when a contiguous slot of wider bandwidth becomes available. It should be noted that when several non-adjacent narrow slots become available, these are not usable to make up a broad band channel. It is traditionally considered impossible to change the frequency of a link while it is in operation, without interrupting the transmission and reacquiring the transmission at the new frequency.

This problem is addressed in "Theory and Performance of Frequency Assignment Schemes for Carrier with Different Bandwidths under Demand Assignment SCPC/FDMA Operation," by Chiba, Takahat and Nohara, TEICE Trans. Commun. Vol. E75-B, No. 6, Jun. 6, 1992, which is incorporated herein by reference. This reference proposes to reduce the statistical probability of the problem by an assignment algorithm. At best, this is a partial solution to the problem.

In "Airline—the Flexible Radio Access System," by Siddiqui and Challoner, Ericson Review No. 3, 1996 and in "Next Generation Broadband Flexible Radio Access Network Solution," IBC Conference on Wireless in the Local Loop, London 1996, a system for dynamic allocation in a system with non-uniform bandwidths is proposed. The bandwidth is changed by a "make-before-break" transfer from one frequency band to another. First, a parallel link is set up. When the parallel link is stable, the transmission is transferred to the parallel link and the original link is broken.

The make-before-break mechanism has a number of disadvantages. First, it is not frequency efficient, at least in the short term, when a channel occupies two bands at the same time. Second, the remote station transmitter must be capable of transmitting on two channels at the same time, i.e., they must have twice the power capability that they really need, a very expensive requirement. Third, since the remote station transmitter must transmit two signals at the same time, it must be extremely linear to avoid inter-modulation effects. Such systems are more expensive and consume more power. Finally, the remote station must contain two modems rather than one.

Therefore, there is a need in the art for improvements in bandwidth allocation in communication systems.

SUMMARY

One aspect of some embodiments of the present invention relates to an improved method and apparatus for dynamically allocating bandwidth in a communication system. In some embodiments, some or all of the drawbacks of the make-before-break systems, described above, are reduced or eliminated. According to an aspect of some embodiments of the invention, the frequency of the operational link is changed without an interruption of the link or at least without an interruption of the transfer of payload data and without establishing a parallel auxiliary link. An aspect of some embodiments of the invention is that it is possible to implement variable rate FDMA without make-before-break, with frequency shifting only, without any frequency jumps. According to an aspect of some embodiments of the invention, the data rate, modulation rate and/or symbol timing, i.e., the bandwidth, are changed without interruption of the link or at least without an interruption of the transfer of payload data and without establishing a parallel auxiliary link. According to an aspect of some embodiments of the invention, both the frequency and the bandwidth are changed without interruption of the link or at least without an interruption of the transfer of payload data and without establishing a parallel auxiliary link. An aspect of some embodiments of the invention is that frequency shifting of a group of adjacent links can be performed in parallel rather than serially, thus saving time.

According to an aspect of some embodiments of the invention improved synchronization methods are provided. According to an aspect of some embodiments of the invention, a first transceiver utilizes a transmission received from a second transceiver to synchronize its transmission parameters in a subsequent transmission with receiving parameters in the second transceiver. Thus, when a transceiver finishes transmitting, the frequency at which it transmitted controls the transmission frequency of the other transceiver for the next transmission. In some embodiments, the first and second transceiver each comprise a central timing clock from which the parameters are derived, preferably by digital circuitry. Preferably, the clock in one transceiver is synchronized to the clock in the other transceiver via normal transmission signals received from the other transceiver. Since synchronization of the clocks automatically synchronizes the parameters, switching may be made from frame to frame.

In some embodiments of the invention, one or more aspects of the invention are implemented in an FDMA system utilizing FDD. In some embodiments of the invention, one or more aspects of the invention are implemented in an FDMA system utilizing TDD. In some embodiments of the invention, one or more aspects of the invention are implemented in an FDD system with TDD benefits.

Embodiments of the present invention will be more clearly understood from the following description of embodiments thereof, taken together with the following drawings, in which the same reference numerals are used to refer to the same or similar features.

DETAILED DESCRIPTION

Figure 1:
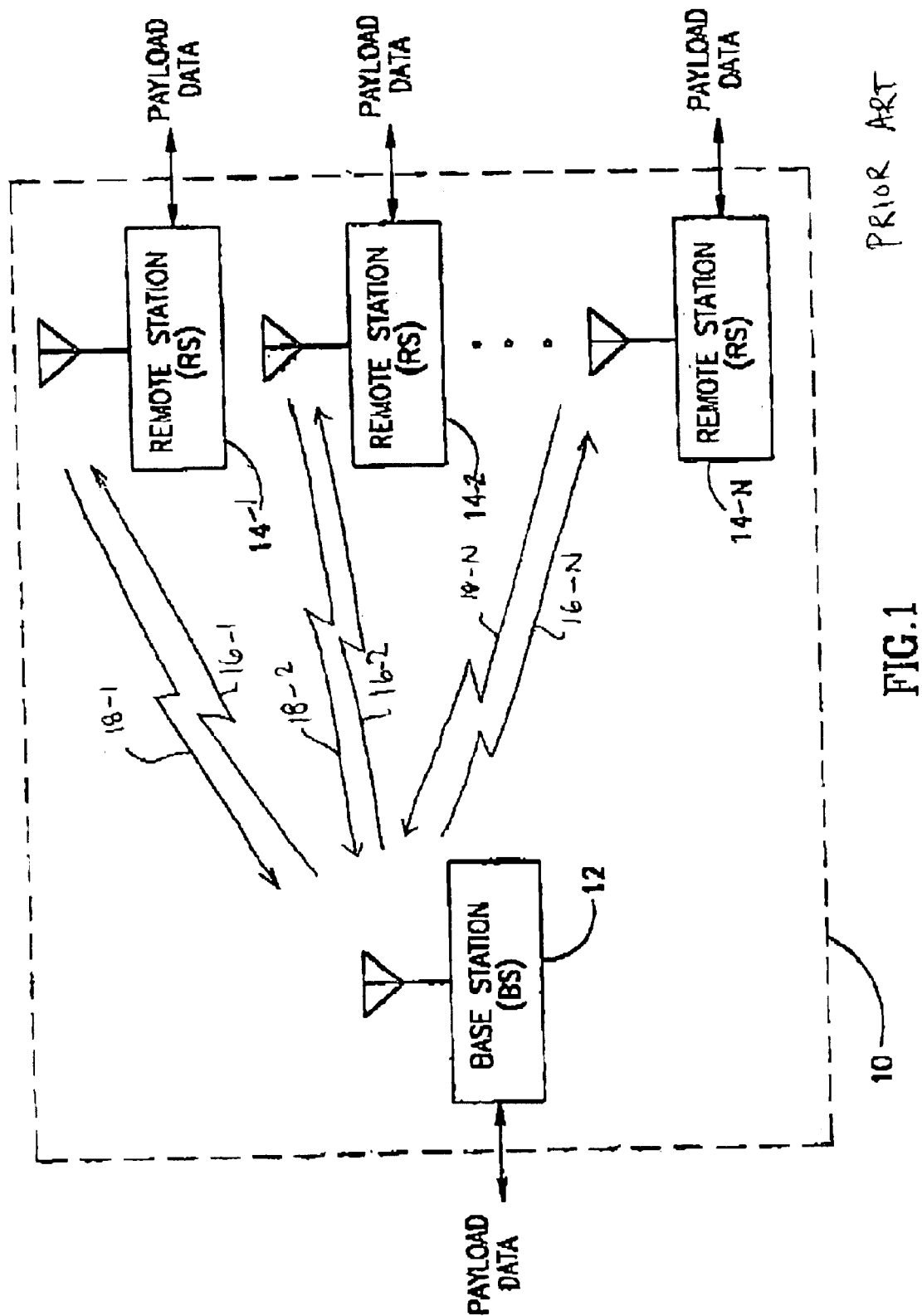
FIG. 1 is a block diagram of a conventional communication system.
Figure 2:
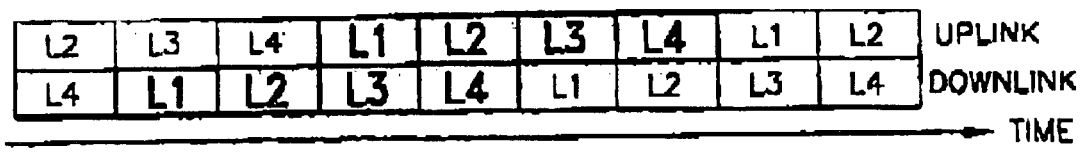
FIG. 2 is a graph of an example of a time slot allocation for TDMA with the advantage that transmitter-to-receiver isolation is not required at the remote station in a conventional system.
Figure 3:
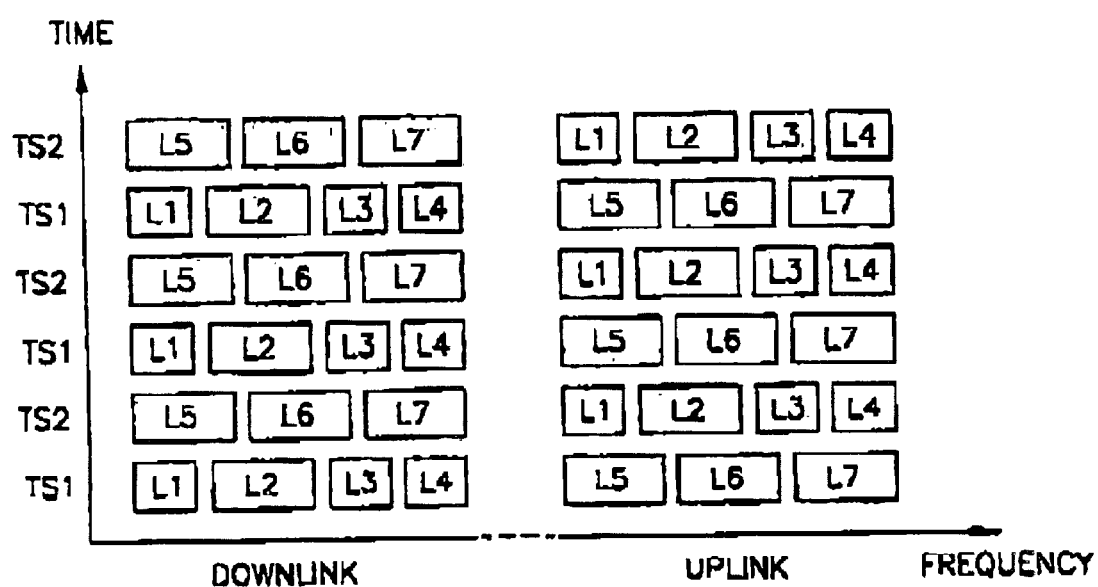
FIG. 3 is a graph that represents an example of a time/frequency slot allocation for a hybrid FDMA system which combines FDD and "TDD like" operation in accordance with one embodiment of the invention.

FIG. 3 shows a time/frequency slot allocation of a point to multi-point communication system in accordance with an embodiment of the invention. The system of FIG. 3 operates in a hybrid arrangement having different frequencies for down-link and up-link and different times of transmission of up-link and down-link. This system incorporates a main advantage of TDD (avoiding isolation problems) in an FDD system and allows for the following:

Different frequencies for down-link, and up-link (which is, in many cases, a regulatory requirement)

Different times of transmission and reception at the remote station (thus eliminating the need for the transmitter-to-receiver isolation at the remote station, which is hard and expensive to achieve)

Spectral efficiency: the two points above are achieved without wasting spectrum.

However, it does share the disadvantage of ordinary TDD systems in that the transmission is not continuous. However, as will become evident below, this problem can be overcome, in accordance with an embodiment of the invention. On the other hand, depending on the number of transmission (time) groupings (two are shown in FIG. 3) the peak-to-average power ratio is improved over that of a standard TDD system.

In the hybrid system of FIG. 3, as in a regular FDMA/TDD system, a preamble must be provided at the beginning of transmission of each frame to provide for acquisition of the signal. In accordance with one embodiment of the invention, the length of this preamble (for either the hybrid system or an FDMA/TDD system) is shortened. In embodiments of the present invention, the shortened gap between transmissions allows for a simplification of synchronization between the transmitter and receiver and shortening of the preamble.

Figure 4:
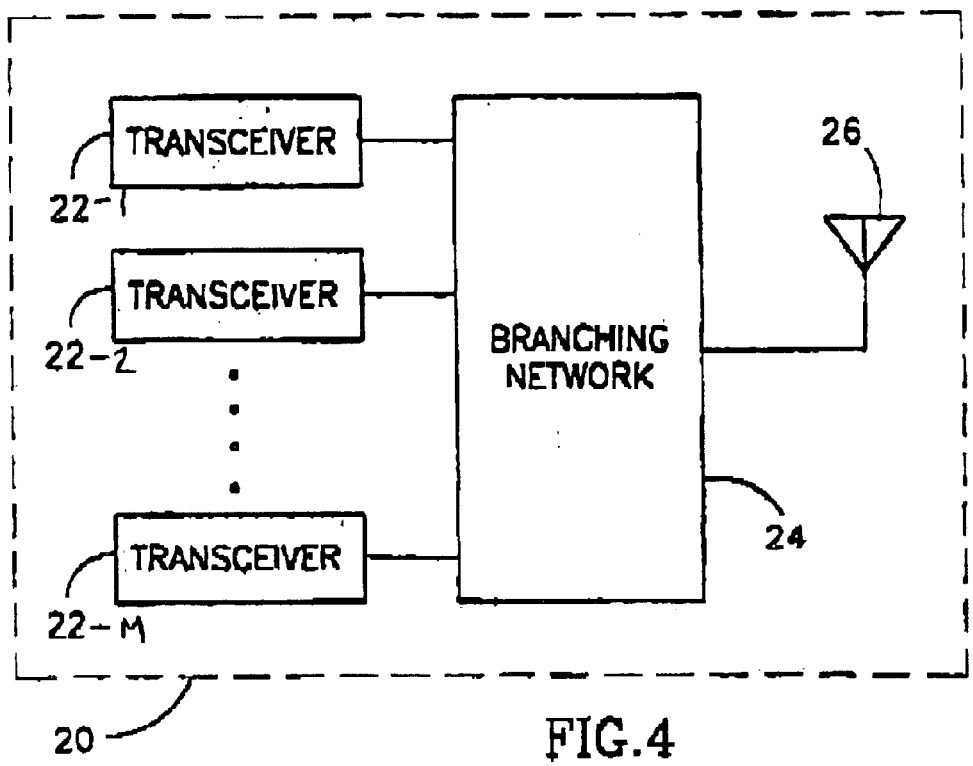
FIG. 4 is a block diagram of an example of a functional partition of a base station in accordance with an embodiment of the invention.

FIG. 4 illustrates the operation of an embodiment of a base station of an FDMA system. This embodiment illustrates one partition of the base station. System 20 functionally comprises a plurality of transceivers 22-1, ..., 22-M, each of which is dedicated to a different link (e.g., a different remote station). The functional system 20 also includes a branching network 24, which combines signals from the transceivers for transmission by an antenna 26. Branching network 24 also transfers the signals received by the antenna 26 to the transceivers 22-1, ..., 22-M. In FDMA, each transceiver operates at a different frequency. When implemented, the division shown in FIG. 4 is usually only functional. In actuality, in most base station systems a different division, as shown in FIG. 5, is used.

Figure 5:
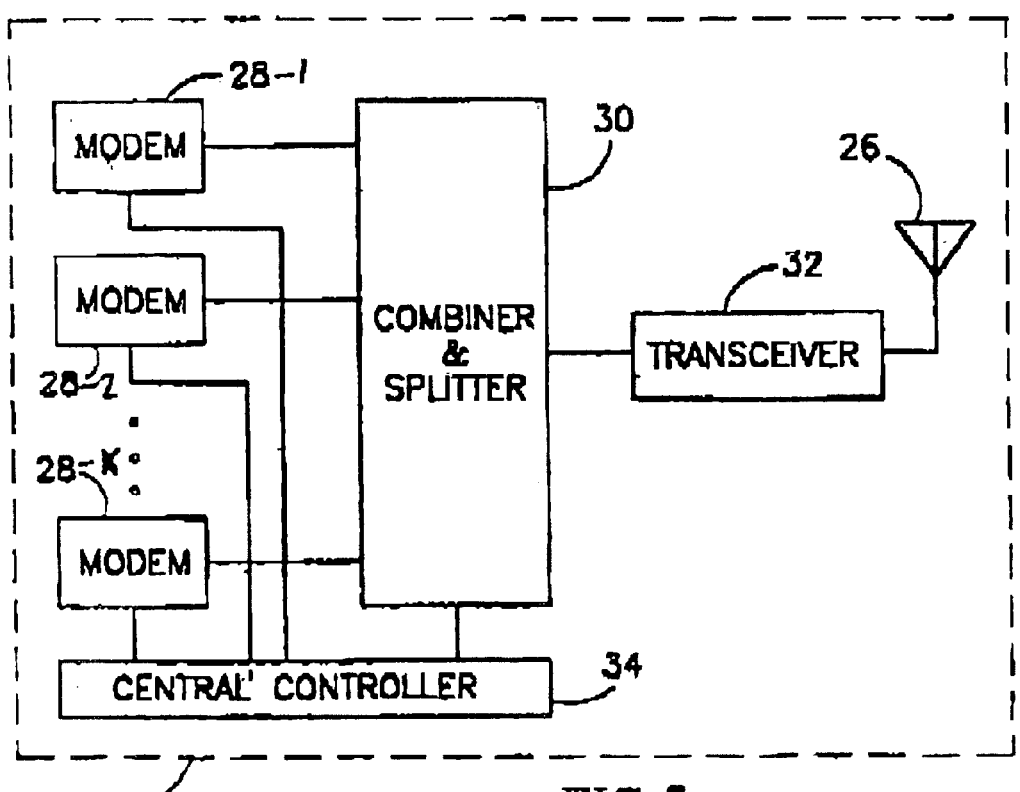
FIG. 5 is a block diagram of an example of a physical partition of the base station of FIG. 4, in accordance with an embodiment of the invention.

In embodiment of FIG. 5, base station 20' includes a plurality of modems 28-1, ..., 28-K, e.g., one modem being provided for each link. Modems 28-1, ..., 28-K operate at different base-band or IF frequencies. The modems 28-1, ..., 28-K are coupled to a combiner/splitter 30. Signals from modems 28-1, ..., 28-K are converted to RF frequencies for transmission in a single transceiver 32 for transmission to antenna 26.

Figure 6:
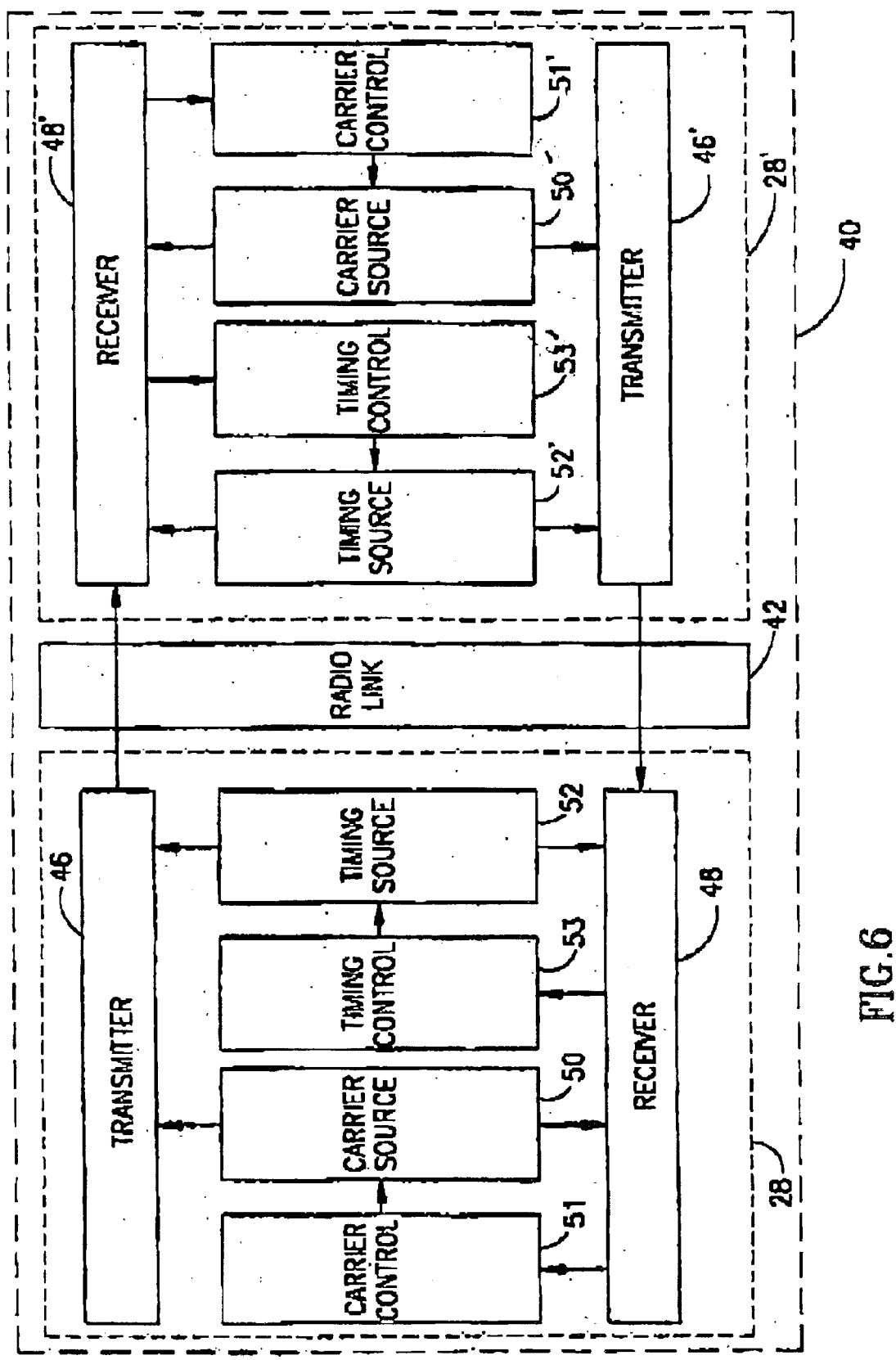
FIG. 6 is a block diagram of an individual link in a communication system in accordance with an embodiment of the invention.

FIG. 6 is a block diagram of a single communication channel 40 (a single link) in accordance with one embodiment of the invention. Channel 40 includes a base station modem 28 (as in FIG. 5), a radio link 42 and an remote station modem 28'. Radio link 42 includes combiner/splitter 30, transceiver 32 and antenna 26 as well as a corresponding antenna and transceiver in the remote station. Base station modem 28 and remote station modem 28' have similar constructions (which is emphasized by using the same reference numbers for both of them and for their components with a prime for the remote station modem).

Base station modem 28 preferably includes a transmitter 46 and a receiver 48. A carrier source 50 preferably supplies the carrier or LO source (or sources) for transmitter 46 and for receiver 48. The frequency and the phase of the carrier source 50 are controlled by a carrier controller 51. A timing source 52 preferably provides timing for symbol transmission at the transmitter 46 and symbol detection at the receiver 48 as well as higher level timing (e.g., transmission frames and time-slots). The frequency and the phase of the timing source 52 are controlled by a timing controller 53.

In one embodiment, remote station modem 28' is similar to modem 28. It includes a transmitter 46', a receiver 48', a frequency source 50', a frequency controller 51', a timing source 52', and a timing control 53', and operates in the same manner as base station modem 28.

In accordance with one embodiment of the invention, during transmission of the down-link, remote station receiver 48' tracks the base station transmitter 48. Carrier controller 51' analyzes the received signal, detects the difference in frequency and phase between the local carrier produced by 50' and the remote carrier produced by 50 and adjusts the frequency and phase of 50' to those of 50. Similarly, timing controller 53' analyzes the received signal, detects the difference in frequency and phase between the local timing produced by timing source 52' and the remote timing produced by timing source 52. Timing controller 53' then adjusts the frequency and phase of timing source 52' to those of timing source 52.

Similarly, during up-link carrier source 50 and timing source 52 preferably track changes in corresponding sources 50' and 52'. Note that even if the up-link and down-link themselves operate at different frequencies, the same (or locked) carrier source may be used for both links, which allows for such tracking.

It should be understood that part of the time base station modem 28 is tracking remote station modem 28' and the rest of the time remote station modem 28' is tracking base station modem 28. Thus, for substantially all the time (except possibly for short gaps in transmission), the base station modem 28 and the remote station 28' are locked together. Since the time gap between receiving and transmission are very short, sources 50' and 52' in the remote station modem 28' are substantially synchronized to sources 50 and 52 in the base station modem 28 at the beginning of each down-link frame. Similarly, sources 50 and 52 in base station modem 28 are substantially synchronized to sources 50' and 52' in the remote station modem 28' at the beginning of each up-link frame. In fact, it has been found that for the timing source 52 (52') there is no need for reacquisition of the frequency or the phase. For the carrier source 50 (50'), there is no need for reacquisition of the frequency, however. Phase acquisition is required if coherent modulation is used.

Furthermore, it is possible to change the link parameters (frequency, data rate, modulation rate, coding, symbol timing, bandwidth) while the link is operational, without interrupting the operation. In one embodiment, the link parameters are kept constant during a frame (transmission period) and are changed only from period to period. Down-link and up-link parameters are often independent of each other (as for example on a data link) such that either or both up- or down-link parameters, in one embodiment, are changed.

As an example, consider the case of a change in the down-link parameters. Each down-link frame and each up-link frame include, aside from a "payload" and various overhead data, link control data which is transmitted between the base station modem 28 and the remote station modem 28'. In one embodiment, the link control data is used, among other things, to control the synchronous changes of link parameters.

In one embodiment of the invention, for a change in down-link parameters, base station modem 28 sends remote station modem 28' a set of parameters for the down-link (carrier frequency, symbol timing, etc.) and a frame in which they take effect. For example, they may take effect in the next frame or in the third frame, etc. During the last up-link before the new parameters take effect, the base station modem 28 sets its transmitter and the remote station modem 28' sets its receiver with the new set of parameters. Note that remote station receiver 48' and the base station transmitter 46 are not active during the up-link. The next frame is transmitted and received with the new parameters.

In order to assure that the parameters are synchronized, in the base station modem 28 and remote station modem 28', when the first frame with the new parameters is transmitted, it is necessary to synchronize the base station modem 28 and remote station modem 28' during the previous link, when the parameters are not yet in use. In one embodiment of the invention, this is accomplished by providing a direct relation between the old and new parameters and synchronizing the parameters in the base station modem 28 and remote station modem 28' based on the existing transmission, in the previous frame.

Figure 7:
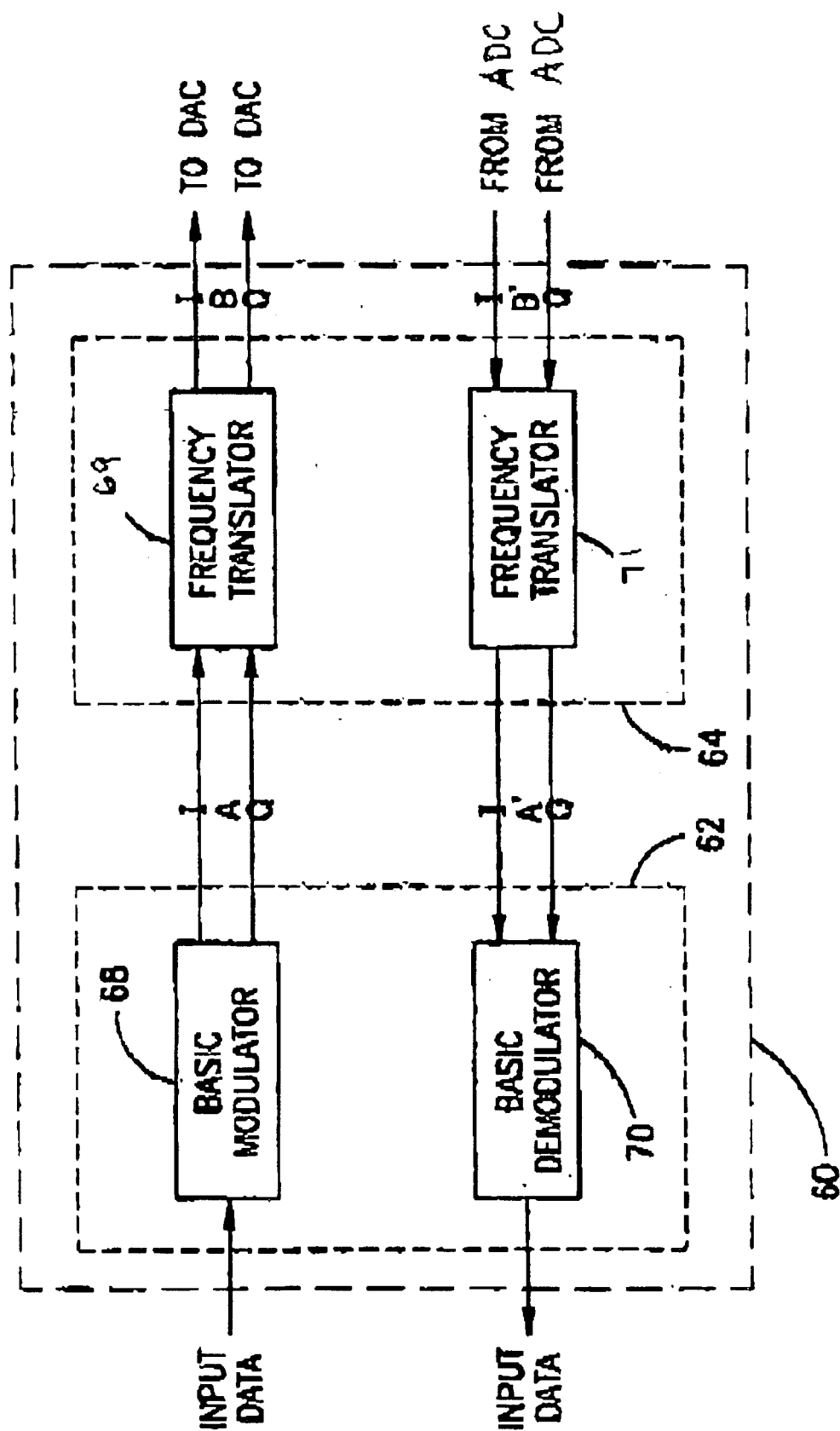
FIG. 7 is a block diagram of a modem for a single link in accordance with a embodiment of the invention.
Figure 8A:
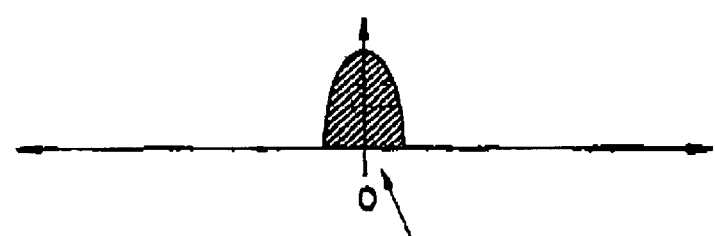
FIGS. 8A, 8B, and 8C are graphs that show signal spectra at various points in the modem of FIG. 7 and the RF spectra.
Figure 8B:
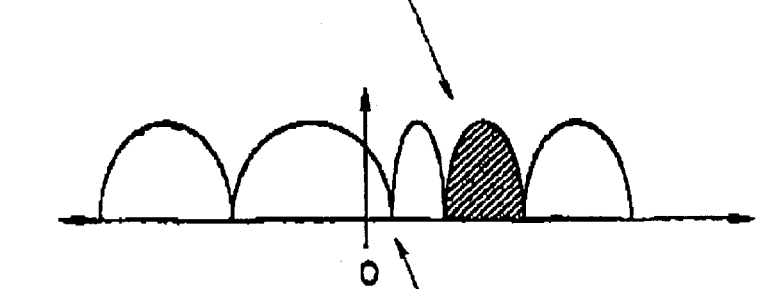
Figure 8C:
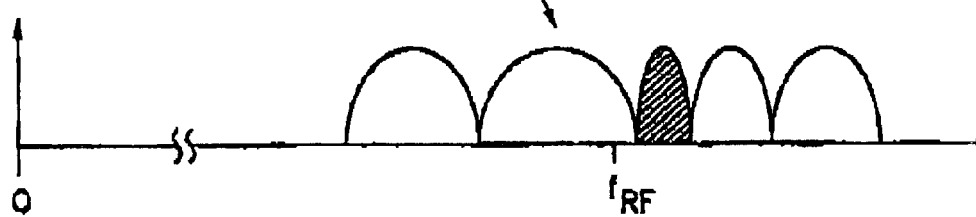

FIG. 7 is a block diagram of one embodiment of a remote station modem 60, suitable for instantaneous change of link parameters. FIGS. 8A, 8B, and 8C are graphs that show signal spectra at various points in the modem of FIG. 7 and the RF spectra. For example, FIG. 8A shows a typical spectra at points A and A' of FIG. 7. FIG. 8B shows a typical spectra at points B and B' of FIG. 7. FIG. 8C shows a typical spectra for radio transmissions. In some embodiments of the invention, similar modems are used in the base station and the remote station. Modem 60 has been divided into two parts, a basic modem 62 and a frequency translator 64. Modem 60 includes two data paths, a transmitting path with a basic modulator 68 and a frequency translator 69 and a receiving path with a basic demodulator 70 and a frequency translator 71. The basic modulator 68 modulates the input data into a complex (I & Q) base-band waveform which is then shifted in frequency by the frequency translator 69 into its appropriate place within the bandwidth of the base station. This process is illustrated in FIGS. 8A, 8B, and 8C. The basic modulator 68 and the frequency translator 69 are digital signal processors and their outputs are complex base-band waveforms that are presented digitally.

The receive path receives signals from an analog-to-digital converter (ADC). The receive path includes frequency translator 71 and basic demodulator 70. The frequency translator 71 shifts the appropriate link signal into base band. The complex base-band signal is then demodulated by the basic demodulator 70, which detects and extracts the output data. The basic demodulator 70 and the frequency translator 71 are also digital signal processors and their inputs are complex base-band waveforms, which are presented digitally.

Since the modem 60 is a digital signal processor, it is easy to change the link parameters in a precise and fully synchronized way. Changing the central (carrier) frequency is accomplished by changing the frequency offset parameter at the frequency translator 69 of the transmitting path and at the frequency translator 71 at the receiving path. Changing the other link parameters is accomplished by changing the appropriate parameters at the transmit and receive portions in basic modem 62.

The previous section considered non-continuous FDMA (TDD or TDD like). The following section considers continuous FDMA (with FDD). For an FDMA system with FDD, the link parameters may be changed, while the link is operational, in accordance with one embodiment of the invention, in much the same way as described above for FDMA with TDD. All link parameters except possibly for the central frequency, are kept constant during a frame and changes are made from frame to frame. However, some additional problems arise due to the continuous nature of FDMA/FDD transmission.

Firstly, changing the symbol timing or the central frequency suddenly is problematic. A sudden change in the central frequency during a transmission would introduce wide band interference to all the other links.

Additionally, changing the symbol timing suddenly is also problematic. In order to maintain a minimal transmission bandwidth, the transmission symbols are shaped by a low-pass shaping filter. In order to eliminate extraneous signals, the received signal is filtered by a low-pass filter matched to the shaping filter. The total channel response is the combination of the effects of the two filters. In order to maintain minimum transmission bandwidth, the duration of the channel response must be several symbols long. If the symbols are more closely spaced than the channel response, the symbols, after filtering, will overlap and a phenomenon called Inter Symbol Interference (ISI) will result. The channel response is designed to meet the Nyquist criteria: zero ISI at the sampling point of the symbols. If the symbol timing is changed during transmission, the sampling point of the old rate will not coincide with those of the new rate and ISI will result. A gap in transmission of at least D1/2+D2/2, where D1 is the duration of channel response at the old rate and D2 is symbol duration at the new rate, avoids this problem.

However, there does exist a method of changing either or both the symbol timing and the central frequency as a step function without an interruption of the rate of transfer of payload data, albeit with some interruption of transmission.

The transmission is composed of frames. The frames comprise three types of data:

1) A fixed pattern at a fixed location in each frame used for frame synchronization (usually called a "synchronization word").
2) Overhead data used for operation, control and management of the system, including radio link operation, control and management.
3) Payload data.

The frame is organized as follows: synchronization word, followed by overhead data, followed by payload data.

In many applications (for example, traditional, non-compressed voice conversation), the payload data has a fixed data rate and a fixed position within the frame. Thus, if the transmission is to be interrupted to change either the symbol timing or central frequency, it cannot be done by delaying a frame or by reducing the number of payload bits.

The length of the frame is fixed. When communication is initiated, the frame synchronization word is required to properly synchronize the transmitter and receiver. However, after synchronization is achieved, and communication is continuous, the synchronization word is needed only in order to verify that synchronization has not been broken due to some timing error. Therefore, the transmitter may occasionally replace the synchronization word by another pattern, or omit it, if the receiver knows about the change. Furthermore, the overhead data consists of fixed repetitive data (e.g., link status) and variable rate messages. The fixed rate data, since it is repetitive, can also be occasionally omitted. Similarly, the variable rate messages may be omitted occasionally.

When it is desired to change symbol timing or frequency, a gap in the transmission is introduced by omitting as many symbols as required from the synchronization word and/or from the overhead data. After this period of no transmission, transmission is restarted with the new parameters.

There is fundamental difference between the carrier frequency and all other link parameters. A requirement to change any of the link parameters, other than the carrier frequency, usually comes from the link (e.g., the remote station requires additional transmission rate; a momentary fading implies a demand for more bandwidth for coding). A required change in carrier frequency of a given link is usually caused by a demand of another link to have more bandwidth, a demand which can be fulfilled only by re-arrangement of the carrier frequencies of several other links.

Due to this difference, it is advantageous to be able to change the link carrier in frequency with minimum interruption to the link. This can be done (in a system with continuous transmission), in accordance with one embodiment of the invention, by slowly (continuously) or incrementally changing the transmitter carrier. Since the receiver carrier is locked to the transmitter carrier, the receiver tracks the slow change in frequency and the link is not broken.

There are two possible ways to change the carrier (central frequency) of a link: by a jump to a new frequency, or by a continuous shift of the frequency. An advantage of the jump is that it is quick. A disadvantage of the jump is that it might be risky: at the new frequency the link might encounter unexpected difficulties such as high noise level due to a narrow band interference or frequency-selective fading due to multi-path. In case of a slow shift of the frequency, such difficulties are encountered gradually, if at all. Therefore, the link can be adjusted to those changes before they become destructive (e.g., by increasing the transmission power, by changing to a more robust modulation, by using forward error correction coding or by adjusting the equalizer). Therefore, in some cases the continuous shift of frequency has advantages.

An aspect of some embodiments of the invention is that it is possible to implement variable rate FDMA without make-or-break, with frequency shifting only, without any frequency jumps.

An aspect of some embodiments of the invention is that frequency shifting of a group of adjacent links can be performed in parallel rather than serially, thus saving time.

Changing the carrier frequency of a link during operation is used with variable rate FDMA (without make-or-break) for two reasons:

a) To make space for an existing link that needs more bandwidth.
b) To group several non-continuous frequency slots into one, wider slot to be used by a new, wider band link.

Figure 9A:
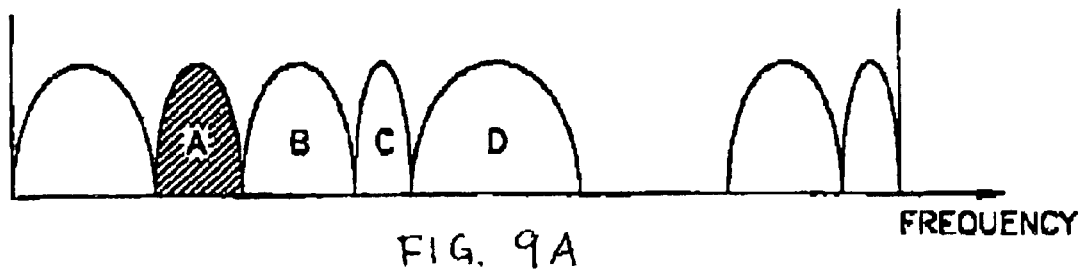
FIGS. 9A, 9B, and 9C are graphs that illustrate a method of providing increased bandwidth for a user of a multi-user system in accordance with an embodiment of the invention.
Figure 9B:
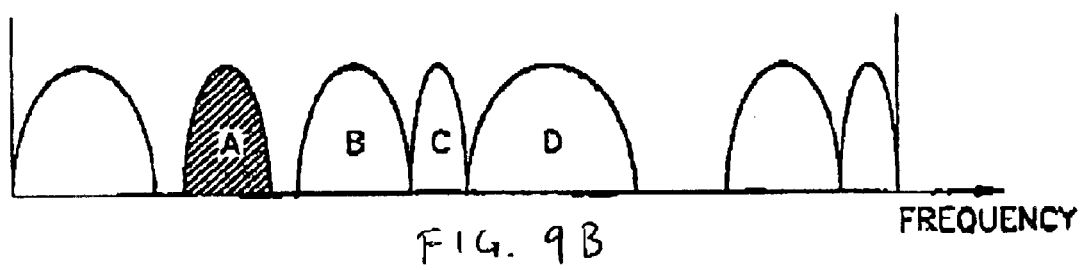
Figure 9C:
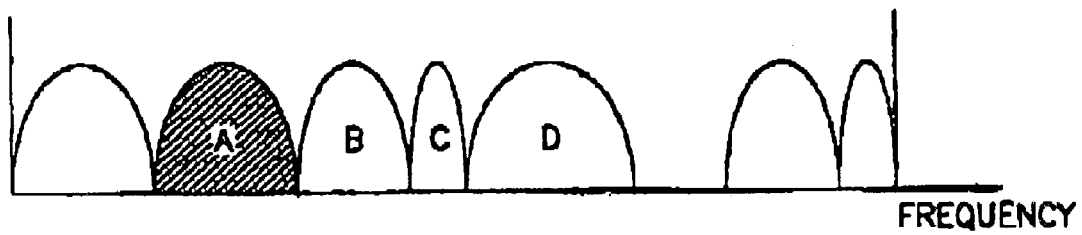

FIGS. 9A, 9B, and 9C are graphs that illustrate an embodiment of a method for making space for an existing link that needs more bandwidth. FIGS. 10A, 10B, 10C, and 10D are graphs that illustrate an embodiment of a method for grouping several non-contiguous frequency slots into one, wider slot to accommodate a new, wider band link. In each embodiment, frequency shifting alone is used.

In FIGS. 9A, 9B, and 9C link A needs to expand its bandwidth. Links B, C and D are shifted in frequency to make room for link A to expand as shown in FIG. 9B. Link A is shifted to the center of the available bandwidth, and then expanded as illustrated in FIG. 9C.

Figure 10A:
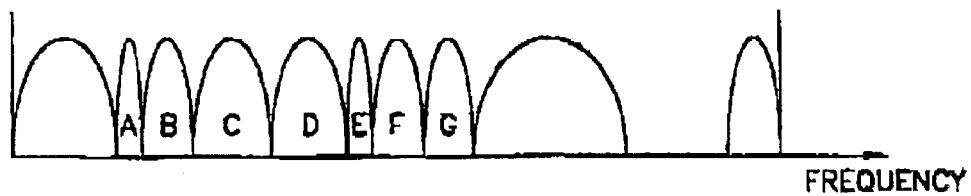
FIGS. 10A, 10B, 10C, and 10D are graphs that illustrate a method of inserting a user requiring an unavailable continuous bandwidth in accordance with an embodiment of the invention.
Figure 10B:
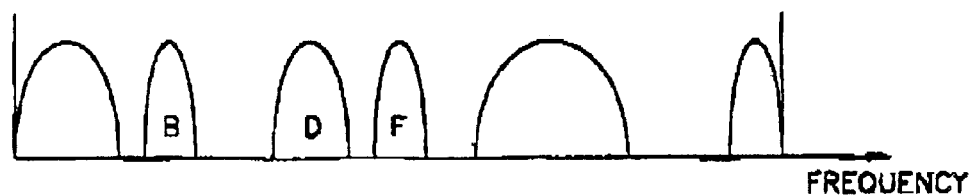
Figure 10C:
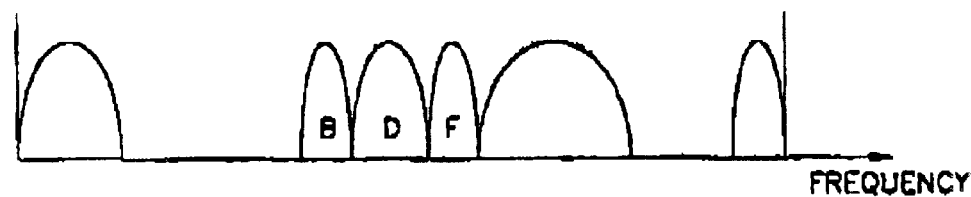
Figure 10D:
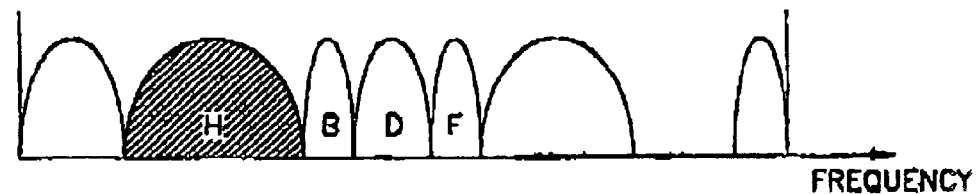

In FIG. 10A links A, C, E and G cease operating. As shown in FIG. 10B this leaves several non-contiguous frequency slots. There is need to establish a new link H, but there is no available contiguous bandwidth wide enough to support it. As shown in FIG. 10C, links B, D and F are shifted in frequency, and a wider frequency slot is achieved created. This frequency slot is used for link H as shown in FIG. 10D.

In order to save time, all links are shifted in parallel. The central controller of the base station controls the frequency shifting by sending frequency-shifting commands and by receiving indications of the central frequency of each link. The central base station controller takes care that no link is being shifted to a bandwidth that is currently being occupied by another link. For example, the central base station controller monitors the shift of links B, C and D in FIGS. 9A, 9B, and 9C, and ensures that C does move faster than link D and that link B does not move faster than link C.

An aspect of some embodiments of the invention is that frequency rearrangement is performed in the background in order to optimize the frequency arrangement to allow for immediate response to anticipated requirements. For example, after links A, C and E in FIG. 10A have been freed, links B, D and F are moved together to make place for a future requirement for a wider frequency slot, even if there is no present requirement. In general, unused frequency bands are consolidated in this way on a regular basis, without disturbing the transmission of the existing users. Additionally, if link A (in FIG. 9A) is known (based on previous statistics) to have a high probability of requiring wider bandwidth than it occupies at the moment, links B, C and D can be moved in advance (if there is free spectrum to do it).

Embodiments of the present invention have been described. It should be understood that the invention may be practiced with varying apparatus. In particular, various methods of base stations and remote stations having the same or similar functionality to those described will occur to persons of skill in the art and may replace the structure shown.

The words "comprise" and "include" and their conjugates, when used herein mean "including but not necessarily limited to." The described embodiments of the invention are exemplary and are not meant to be limiting.

What is claimed is:

1. A method of dynamic modification of a communication link, the method comprising:
   assigning a new carrier frequency to a first communication link;
   adjusting the carrier frequency of the first communication link until the new carrier frequency is reached without substantially interrupting the first communication link; wherein the first communication link uses a single link during the modification; and
   adjusting the frequency of at least one additional link;
   wherein the first communication link and at least one additional link comprise a duplex link.

2. A method of dynamic modification of a communication link, the method comprising:
   assigning a new carrier frequency to a first communication link;
   adjusting the carrier frequency of the first communication link until the new carrier frequency is reached without substantially interrupting the first communication link; wherein the first communication link uses a single link during the modification; and
   adjusting the frequency of at least one additional link;
   wherein adjusting the frequency of at least one additional link comprises incrementally adjusting the frequency of the at least one additional link.

3. A method of dynamic modification of a communication link, the method comprising:
   assigning a new carrier frequency to a first communication link;
   adjusting the carrier frequency of the first communication link until the new carrier frequency is reached without substantially interrupting the first communication link; wherein the first communication link uses a single link during the modification; and
   adjusting the frequency of at least one additional link, wherein adjusting the frequency of at least one additional link comprises continuously adjusting the frequency of the at least one additional link.

4. A method of synchronizing two transceivers that transmit during non-overlapping time periods, the method comprising:
   during a period when a first transceiver transmits, tracking of at least one link parameter of the transmission by a second transceiver; and
   adjusting at least one link parameter of the second transceiver, for transmissions by the second transceiver after the first transceiver ceases its transmission; wherein the at least one link parameter comprises a carrier frequency of the transmission.

5. A method of synchronizing two transceivers that transmit during non-overlapping time periods, the method comprising:
   during a period when a first transceiver transmits, tracking of at least one link parameter of the transmission by a second transceiver; and
   adjusting at least one link parameter of the second transceiver, for transmissions by the second transceiver after the first transceiver ceases its transmission; wherein the first transceiver captures the transmission by the second transceiver without acquisition of the frequency of transmission of the second transceiver.

6. A method of synchronizing two transceivers that transmit during non-overlapping time periods, the method comprising:
   during a period when a first transceiver transmits, tracking of at least one link parameter of the transmission by a second transceiver; and
   adjusting at least one link parameter of the second transceiver, for transmissions by the second transceiver after the first transceiver ceases its transmission; wherein the at least one link parameter comprises a symbol timing.

7. A method of synchronizing two transceivers that transmit during non-overlapping time periods, the method comprising:
   during a period when a first transceiver transmits, tracking of at least one link parameter of the transmission by a second transceiver; and
   adjusting at least one link parameter of the second transceiver, for transmissions by the second transceiver after the first transceiver ceases its transmission;
   wherein:
   during a period when the second transceiver transmits, tracking of at least one link parameter of the transmission by the first transceiver; and
   setting of the at least one link parameter of the first transceiver, for transmissions by the first transceiver after the second transceiver ceases its transmission.

8. The method according to claim 7, wherein the at least one link parameter for the transmission by the second transceiver is different from the at least one link parameter for the transmission by the first transceiver.

9. A method of synchronizing two transceivers that transmit during non-overlapping time periods, the method comprising:
   during a period when a first transceiver transmits, tracking of at least one link parameter of the transmission by a second transceiver; and
   adjusting at least one link parameter of the second transceiver, for transmissions by the second transceiver after the first transceiver ceases its transmission; wherein the at least one link parameter is the phase of the carrier frequency of the transmission.

10. A method of providing for a wider bandwidth channel of a first transmitter in a multi-user communication system, the method comprising:
   moving the carrier frequency of at least one transmitter adjacent to the first transmitter, away from the carrier frequency of the first transmitter, using a single link while moving the carrier frequency; and
   increasing the bandwidth of the first transmitter to occupy at least part of the bandwidth vacated by the movement of the at least one adjacent transmitter.

11. The method according to claim 10, wherein moving the carrier frequency comprises incrementally moving the carrier frequency.

12. The method according to claim 10, wherein moving the carrier frequency comprises continuously moving the carrier frequency.

13. The method according to claim 10, and also including moving a carrier frequency of at least one additional transmitter together with the at least one adjacent transmitter to vacate bandwidth such that the at least one adjacent transmitter can move away from the carrier frequency of the first transmitter.

14. The method according to claim 13, wherein carrier frequencies of the at least one adjacent transmitter and the at least one additional transmitter move concurrently.

15. A method of providing contiguous bandwidth for a user in a multi-user communication system comprising:
   moving one or more carrier frequencies of one or more communication links to create an unused, contiguous frequency band without establishing parallel links; and
   filling the unused, contiguous frequency band with a new link.

16. The method according to claim 15, wherein moving one or more carrier frequencies comprises incrementally moving one or more carrier frequencies.

17. The method according to claim 15, wherein moving one or more carrier frequencies comprises continuously moving one or more carrier frequencies.

* * * * *